United States Patent [19]

Rivinius

[11] 4,217,971
[45] Aug. 19, 1980

[54] ROTATING POWERED STEP

[76] Inventor: Theodore Rivinius, 810 N. Second St., Bismarck, N. Dak. 58501

[21] Appl. No.: 12,956

[22] Filed: Feb. 16, 1979

[51] Int. Cl.$^2$ .............................................. B60R 3/02
[52] U.S. Cl. ........................................ 182/2; 182/91; 280/166
[58] Field of Search .................... 182/2, 141, 148, 91; 280/166

[56] References Cited

U.S. PATENT DOCUMENTS

| | | | |
|---|---|---|---|
| 3,266,594 | 8/1966 | Antosh | 280/166 |
| 3,762,742 | 10/1973 | Bucklen | 280/166 |
| 3,911,849 | 10/1975 | Hammelmann | 182/2 |
| 3,986,724 | 10/1976 | Rivinius | 280/166 |
| 4,098,371 | 7/1978 | Cox | 182/2 |

Primary Examiner—Reinaldo P. Machado
Attorney, Agent, or Firm—Kinney, Lange, Braddock, Westman and Fairbairn

[57] ABSTRACT

A powered step for use with large construction equipment such as large crawler-type tractors, mining trucks and similar vehicles that have an operator's platform located a substantial distance off the ground, and which require storage of any ladder or step within the frame perimeter and above the operator's platform to avoid damage to the step during use. The operator step, as shown, comprises a step member or operator basket mounted on a parallel linkage that is hydraulically operated, for raising and lowering. The step support surface of course remains oriented in space (horizontal), as it is raised and lowered with respect to a horizontal plane. The step includes a mounting means that automatically rotates the step member about ninety degrees between its lowered position and its raised position so that the step movement starts adjacent the side of the machine, and at the end of its raising stroke the step is positioned parallel to the longitudinal axis of the vehicle and within the frame perimeter above the operator's platform.

7 Claims, 5 Drawing Figures

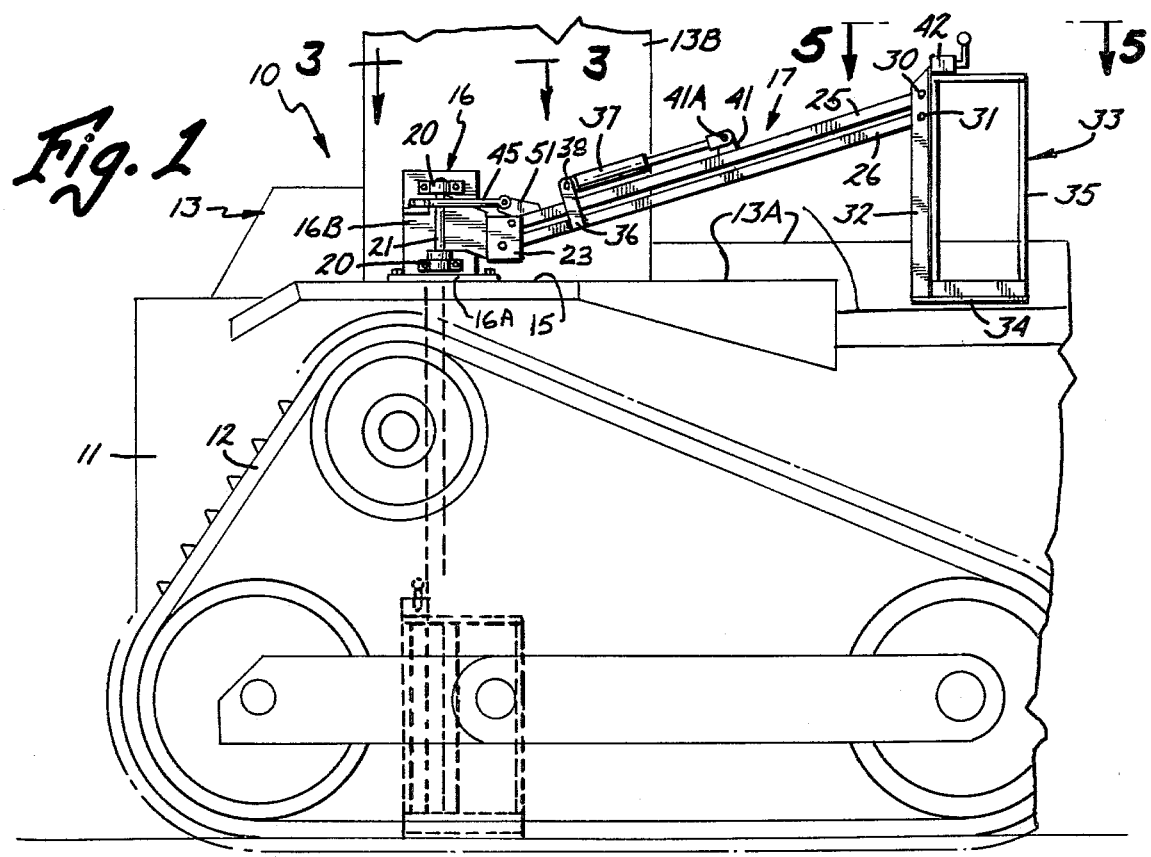
Fig. 1
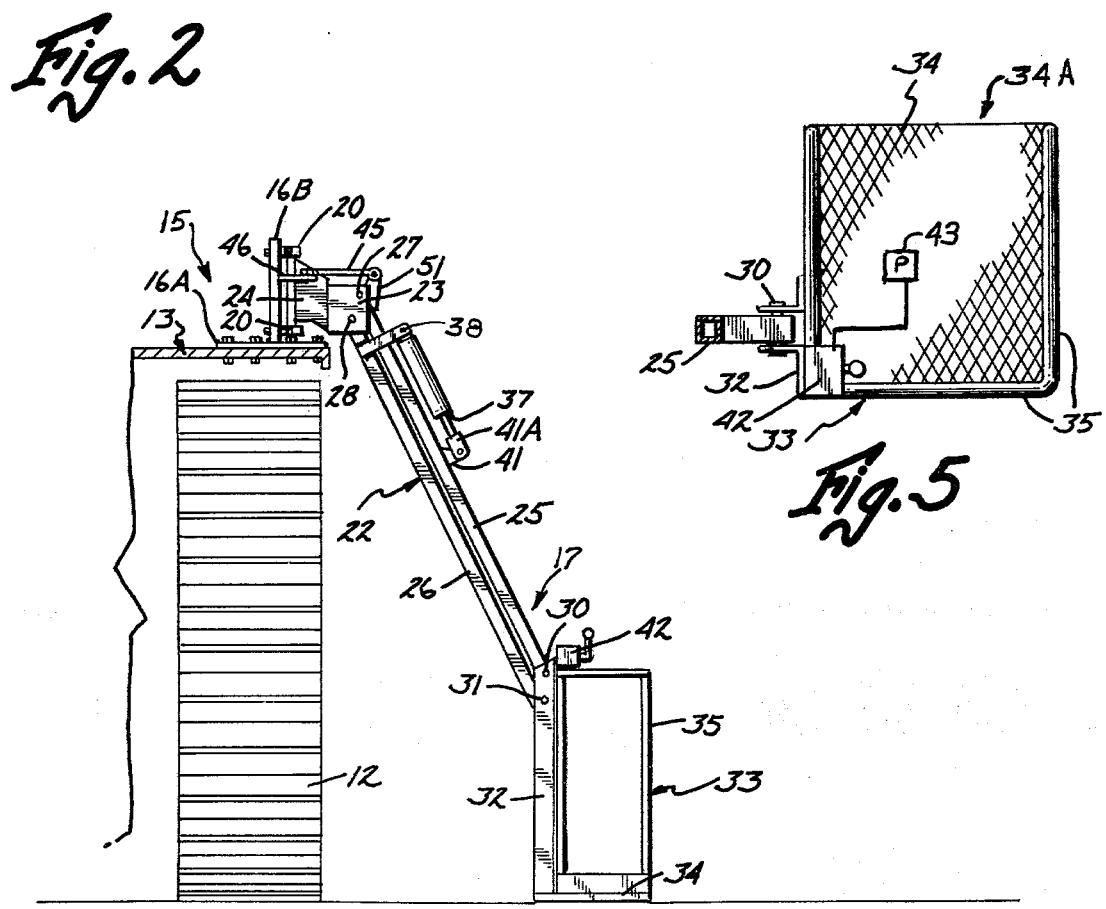
Fig. 2
Fig. 5

ROTATING POWERED STEP

BACKGROUND OF THE INVENTION

1. Field of the Invention

The present invention relates to hydraulically operated steps for large construction and industrial equipment and vehicles.

2. Prior Art

Powered steps for large machinery have been utilized previously, for example in my U.S. Pat. No. 3,986,724 a parallel linkage step is shown. The step remains oriented in a level relationship from a lowered position to a raised position for lifting an operator up to a platform of a machine. The step works very well where adequate room is left beneath the cab or operator's platform of the machine for the step.

SUMMARY OF THE INVENTION

The present invention relates to a safety step for use with large equipment where the operator's platform is reached only by use of a ladder of several steps. The unit is power operated, and provides for a lifting and rotational movement so that the operator step is moved from adjacent the ground to adjacent the operator's platform of the vehicle. The operator can dismount with relative ease. The pivoting action is synchronized with the lifting action and insures that the operator's step is not damaged because the step is positioned within the periphery of the frame of the vehicle when the vehicle is in use.

The unit includes power operated controls to minimize effort and increase safety of operation of large equipment. The device greatly reduces any damage to ladders and the like which previously were used along the sides of such vehicles and which are easily damaged, or which protrude and strike other objects. The step also reduces the hazards of slippery ladder rungs.

BRIEF DESCRIPTION OF THE DRAWINGS

FIG. 1 is a schematic side view of a crawler tractor having a step made according to the present invention installed thereon and shown in raised position.

FIG. 2 is an end view of the device of FIG. 1 with the step in lowered position;

FIG. 5 is an enlarged top view of the operator's bucket used with the device of the present invention taken as on line 5—5 in FIG. 1.

DESCRIPTION OF THE PREFERRED EMBODIMENT

Figure 3:
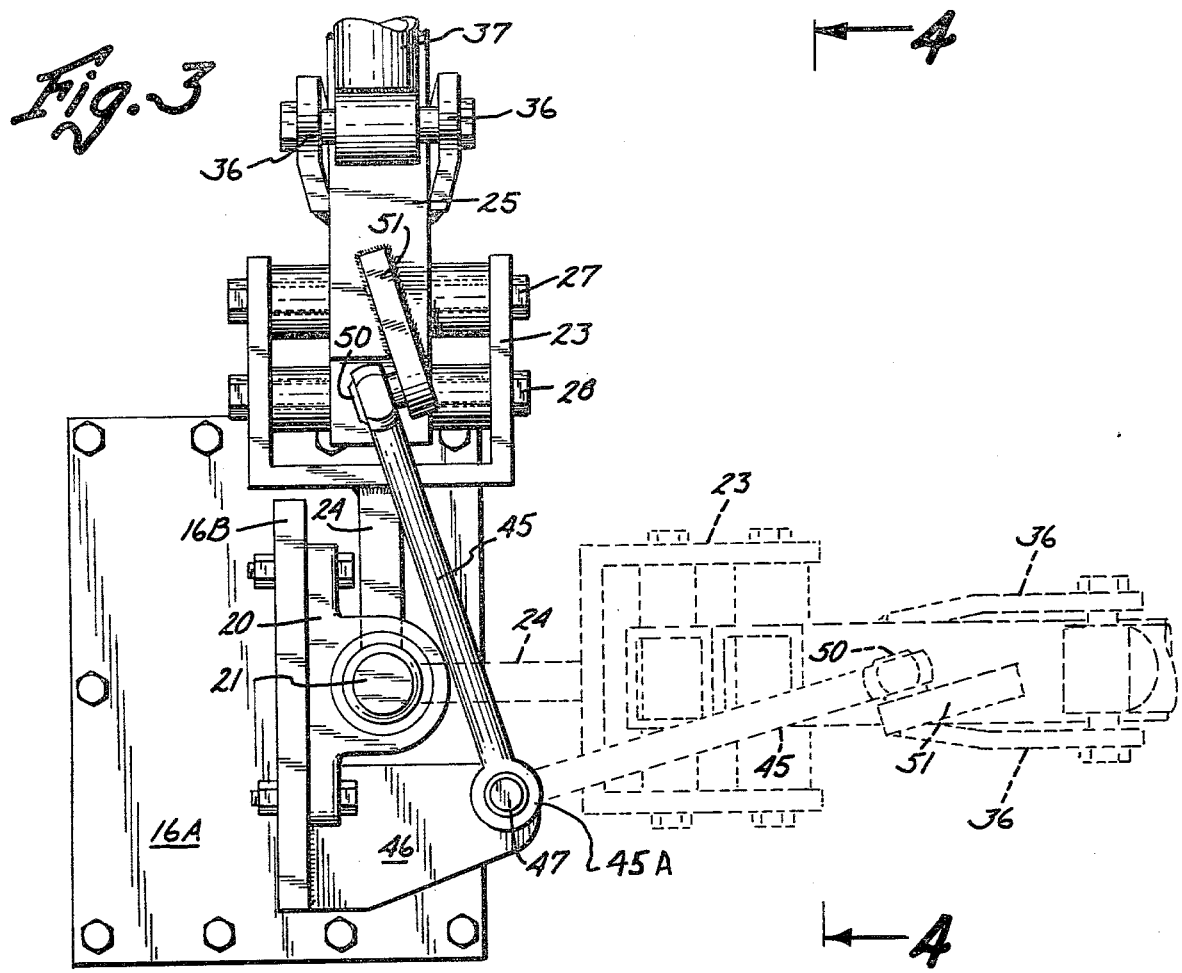
FIG. 3 is a fragmentary top view taken as on line 3—3 in FIG. 1.
Figure 4:
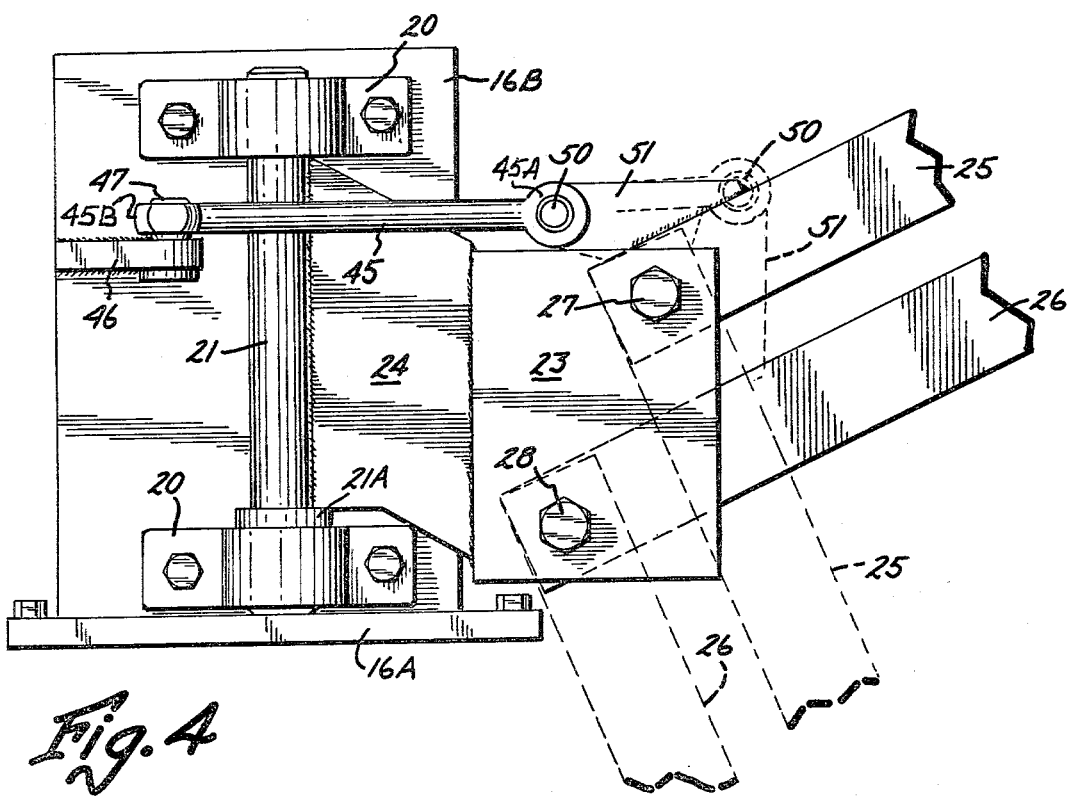
FIG. 4 is a fragmentary side view of the mounting portion of the step taken as on line 4—4 in FIG. 3.

A large vehicle 10, as shown a large crawler tractor, but which could be a large truck, road working or earth moving equipment, and the like is provided with a frame 11, and as shown has a drive track or crawler tread 12 for moving the vehicle over the ground. The crawler tread shown of course is merely by way of example and the vehicle and associated frame is shown only schematically. The vehicle also has an operator's platform 13 which includes step areas 13A and a cab 13B. The term operator's platform in the particular context used here is intended to mean a platform or stepping area on which the operator normally can stand and walk with safety, adjacent to the operator's cab or controls. Thus, a fixed platform adjacent to the cab is considered the operator's platform in the context used here and also the cab floor itself may be such a platform.

The frame 11 includes a region which may be part of the platform for the operator, indicated at 15 and a support 16 forming part of a main support for a movable operator's step assembly indicated generally at 17 is fixedly mounted in the support area 15 on the operator's platform or frame of the vehicle. The support 16 includes a horizontal plate 16A that bolts to the operator's platform, and also includes an upright mounting or support plate 16B which is generally parallel to the longitudinal axis of the vehicle, and is fixedly mounted on plate 16A generally vertically with respect to the horizontal plane. It should be noted that the support 16 may be positioned to be offset from the entry door of the operator's cab and step area.

The upright plate 16B has a pair of pillow block bearings mounted thereon and indicated at 20,20. These pillow block bearings are spaced vertically apart and bolted to the upright plate 16B, and they rotatably mount the end portions of a shaft member 21. The shaft 21 is thus rotatably mounted in the bearings about a generally upright axis. A thrust collar 21A supports the shaft on the lower bearings 20. The shaft 21 forms a main pivot shaft for parallel link assembly indicated generally at 22. The parallel link assembly includes an upper end mounting frame or bracket 23, which is generally channel shaped (see FIG. 3), and the bracket 23 has a support backbone plate 24 welded to the base of the bracket 23, and also welded to the shaft 21 and positioned between the bearings 20,20. Thus the bracket moves with the shaft. The bracket 23 pivotally mounts first ends of a pair of parallel links, comprising an upper link 25, and a lower link 26. The upper link 25 is mounted with a pin 27, and the lower link 26 is mounted with a pin 28 to bracket 23.

The opposite ends of the links 25 and 26 are pivotally mounted as at 30 and 31, respectively, to a frame portion 32 of an operator's step or operator's support 33. The support as shown is a type of a cage or open basket which includes a step member 34, and suitable guide or safety rails 35 along two sides that permit the operator to step onto the support 34 from the open side 34A (see FIG. 5) and be securely held in the support.

The parallel links are operable between a lowered position shown in FIG. 2, and a raised position (FIG. 1) which is above the surface of the ground. Notice that in the lowered position, an operator can easily step from the ground up onto the support 34 without any compromise of safety, and as will be explained, the operator's support 33 will be raised to position so that the operator can merely step very conveniently onto a portion of the operator's platform of the vehicle 10.

The control of the parallel links is accomplished as shown in my U.S. Pat. No. 3,986,724. The lower link 26 has a pair of brackets 36 on opposite sides thereof which are fixed to the link 26 and which straddle the upper link 25. The brackets 36 are not fixed to the upper link 25 and will move relative to the upper link. A hydraulic cylinder assembly, indicated at 37, which is a double acting cylinder, has its base end pivotally connected as at 38 to the brackets 36. The base end of the cylinder is positioned between the brackets 36 and as shown is above the upper link 25 of the parallel link set. The rod end of the cylinder 37 is connected to a bracket 41 that is fixed to the upper parallel link 25. The hydraulic cylinder 37 is operated through a valve indicated at 42 which can be positioned on the operator's support 33 so that the operator can easily control the hydraulic cylinder 37. The valve 42 of course is connected to a pump 43 in the usual manner. This pump can be a pump forming a part of an auxiliary unit driven by an electric motor, or the step may be operated from the hydraulic system of the vehicle.

As explained in U.S. Pat. No. 3,986,724, when pressure is supplied to the base end of cylinder 37, the rod end will extend and this will cause the distance between the mounting point 41A on bracket 41 and pivot 38 to increase. This will cause the parallel links to shift, and as they shift the outer ends will move upwardly upon extension of the cylinder.

Because the vehicles which have very high operator's support platforms cannot accommodate a mounting frame below the support platform in the manner shown in the aforementioned patent, it is difficult to use a straight lifting action for an operator step. To solve that problem, the present device incorporates linkage that causes the entire parallel link assembly, including the frame 23 and support 33 to swing about the axis of shaft 21 in the bearings 20. This action is accomplished by the provision of a control link 45. The control link 45 provides for reacting the movement of the upper parallel link 25 relative to the support plate 16B. As shown, a laterally extending bracket 46 is welded to the upright plate 16B and extends outwardly therefrom. A pin 47 is mounted on the bracket 46 and is generally parallel to the axis of the shaft 21. However, the pin 47 is offset from the shaft 21 as shown in FIG. 3 and is actually positioned outwardly from the plate 16B a greater distance than the shaft 21, and is at a level above the bracket 23. The support pin 47 is also on an opposite side of shaft 21 from the desired position of the operator's support when the operator's support is in its raised position.

This offset is to provide for a leverage or moment that tends to rotate the brackets 23 and 24 with shaft 21 and the parallel links when the parallel links are operated. To accomplish this action the opposite end of the link 45 is mounted to a pin 50 which in turn is mounted on a bracket 51 fixedly connected to the upper one of the links 25. Note that the bracket 51 is skewed slightly for ease of alignment, and note that the pin 50 has an axis that is generally horizontal. The axes of pins 27 and 28 are also generally horizontal in working positions when the vehicle is on a level surface.

Thus it can be seen that as the upper link raises from lowered position to position as shown in FIG. 1 the force on the link 45 will be compressive. Bracket 51 will move about pivot 27 and cause this force. Because the link 45 is constrained by the pins 50 and 47, the link will have to pivot. Note also that the link has spherical rod end bearings 45A and 45B at the respective ends, so that it is universally pivotally mounted on its support pins. Further, because the pin 47 is offset to one side of the shaft 21, as the link 25 raises the link 45 causes a torque tending to rotate the link 25 and the support brackets about pin 21 because of the compressive load on the link 45. The shaft 21, which is pivotally mounted about an axis generally upright and generally parallel to the pin 47 will permit the bracket 23 to start to pivot as the torque increases and the bracket 23 will swing in counterclockwise direction as seen in FIG. 3 as the link 25 raises. By selecting the link positions properly a full 90° of swing can be achieved, before there is any interference with the upper bearing 20 or the shaft 21.

Therefore as the links 25 and 26 raise, and the operator's support 33 is lifted by the parallel link action, the bracket 23 and the links, as well as the operator's support swing a full 90° (or it could be more) so that the support step 34 is adjacent to the operator's platform or is directly above a portion of it so all the operator has to do is step down onto the platform in complete safety.

It can be seen that the operator's support can be left in this raised position all the time that the operator is on the vehicle, and thus it is out of the way within the periphery of the frame and crawler tread of the tractor in the form shown, or within the periphery or perimeter of the frame of other vehicles on which the unit will be mounted. There aren't any overhanging steps or ledges that can be damaged during construction work or which strike other vehicles adjacent to the working vehicle.

When the unit is lowered, the reverse action of course occurs and the link 45 is placed in a tension. Because of the constraints of the link, a moment is again exerted on the bracket 23 and shaft 21, as well as the parallel links to rotate the parallel links back to their original position.

The controls for the hydraulic cylinder assembly 37 may also include parallel valves, one of which could be on the operator's platform so that if another party wishes to be lifted up to the vehicle, the operator's support 33 can be returned empty to its lowered position and then another person can operate the valve 42 to raise the support 33 in the manner previously described.

What is claimed is:

1. A powered step for large vehicles comprising a support member adapted to be mounted onto a vehicle, a mounting bracket mounted with respect to said support member about an upright pivot axis, parallel link means mounted at first ends thereof to said mounting frame about first generally horizontal pivot axes, and an operator support pivotally mounted to second ends of said parallel link means about second axes generally parallel to the first pivot axes, power means coupled to move said parallel link means to raise the operator's support from a first lowered position adjacent the ground to an upper lifted position spaced from the ground, and an actuator link pivotally mounted at one end to one of said parallel link means at position offset from both of the first pivot axes and pivotally mounted at a second end to said support member at a position laterally offset from the upright pivot axis to thereby cause a moment tending to rotate said mounting bracket about said upright pivot axis as the parallel link means are moved about their pivot axes.

2. The combination as specified in claim 1 wherein said operator support in a first position is substantially below the support member, and is substantially on the same level as the support member in a second raised position.

3. The combination as specified in claim 2 and a control bracket attached to an upper one of said parallel links and spaced above the axis of that parallel link, said actuator link being connected to said control bracket.

4. The combination as specified in claim 1 wherein said power means comprises motor means carried with the mounting bracket as the mounting bracket moves about its upright pivot.

5. The combination as specified in claim 1 wherein said actuator link is universally pivotally connected to said support member and to an upper one of said parallel link means.

6. The combination as specified in claim 4 wherein said motor means comprises a hydraulic cylinder, bracket means mounted on a first of said parallel link means and mounting one end of said hydraulic cylinder, said hydraulic cylinder being generally parallel to and at an opposite side of a second of said parallel link means from the first parallel link means, and means connecting the rod end of said hydraulic cylinder to said second parallel link means.

7. For use in combination with a vehicle having an operator support platform substantially spaced above the ground, said vehicle including a frame member adjacent said operator platform, a support adapted to be mounted on said vehicle frame at a level generally the same as said operator platform, an upright pivot pin mounted on said support, a parallel link assembly comprising a first bracket pivotally mounted on said upright pivot, a pair of links pivotally mounted at first ends thereof to said first bracket, an operator's support step member pivotally mounted to second ends of said parallel links, and hydraulic cylinder means connected to raise and lower the second end of said parallel links to move the operator's support step from a first lowered position adjacent the ground, to a second raised position with the operator's step adjacent said operator's platform to thereby permit the operator to move to step from said step to said operator's platform, the improvement comprising a control link connected to said support at a position offset from said upright pivot on a side of said upright pivot opposite from the position desired for stepping onto the operator's platform from said operator's support step when it is in its second position, and said control link being pivotally mounted to one of said parallel links at a position spaced from the pivot of the first end of that parallel link to provide a turning moment tending to turn the parallel link assembly about said upright pivot when the parallel links are operated, and thereby to rotate said parallel link assembly and said operator's support step a desired amount as the second ends of the parallel link assembly move from their first to their second positions.

* * * * *